(12) United States Patent
Varma

(10) Patent No.: US 8,529,731 B2
(45) Date of Patent: Sep. 10, 2013

(54) PROCESS FOR FRACTIONATING SUGARCANE BAGASSE INTO HIGH α-CELLULOSE PULP, XYLAN AND LIGNIN

(75) Inventor: Anjanikumar Jyotiprasad Varma, Maharashtra (IN)

(73) Assignee: Council of Scientific & Industrial Research, New Delhi (IN)

( * ) Notice: Subject to any disclaimer, the term of this patent is extended or adjusted under 35 U.S.C. 154(b) by 337 days.

(21) Appl. No.: 12/677,031

(22) PCT Filed: Sep. 5, 2008

(86) PCT No.: PCT/IN2008/000569
§ 371 (c)(1),
(2), (4) Date: May 24, 2010

(87) PCT Pub. No.: WO2009/031164
PCT Pub. Date: Mar. 12, 2009

(65) Prior Publication Data
US 2010/0276093 A1    Nov. 4, 2010

(30) Foreign Application Priority Data
Sep. 7, 2007   (IN) .................... 1893/DEL/2007

(51) Int. Cl.
*D21C 1/02* (2006.01)
*D21C 3/02* (2006.01)

(52) U.S. Cl.
USPC .............................................. 162/96; 162/68

(58) Field of Classification Search
USPC ............................... 162/55, 68, 96
See application file for complete search history.

(56) References Cited

U.S. PATENT DOCUMENTS

| | | | | |
|---|---|---|---|---|
| 4,470,876 A | * | 9/1984 | Beaupre et al. | 162/16 |
| 4,769,434 A | * | 9/1988 | Van der Klashorst et al. | 527/403 |
| 5,198,074 A | * | 3/1993 | Villavicencio et al. | 162/15 |
| 5,589,033 A | * | 12/1996 | Tikka et al. | 162/84 |
| 5,730,837 A | | 3/1998 | Black et al. | |
| 5,769,934 A | * | 6/1998 | Ha et al. | 106/162.8 |
| 2008/0057555 A1 | | 3/2008 | Nguyen | |

FOREIGN PATENT DOCUMENTS

| | | |
|---|---|---|
| CA | 1282777 C | 4/1991 |
| WO | 00/61858 A | 10/2000 |

OTHER PUBLICATIONS

Atchison, Pulp and Paper Manufacture: Secondary Fibers and Non-wood Pulping: Chapter IV Bagasse Pulping, 1987, The Joint Textbook Committee of the Paper Industry, vol. 3 3rd edition, p. 22, 25, 30, 31, 49, 58, and 59.*
Gullichsen editor, Chemical Pulping 6A, 1999, Fapet Oy, p. A635-A665.*
Atchison, Pulp and Paper Manufacture: Secondary Fibers and Non-wood Pulping: Chapter IV Bagasse Pulping, 1987, The Joint Textbook Committee of the Paper Industry, vol. 3 3rd edition, p. 39-47, 60, 61.*
Database WPI Week 199233 Thomson Scientific, London, GB; AN 1992-269093 XP002508131 & BR PI9 005 762 A (Rhodia SA) Jun. 30, 1992.
English Abstract of BR PI9 005 762 A, 1992.

* cited by examiner

*Primary Examiner* — Anthony Calandra
(74) *Attorney, Agent, or Firm* — Ladas & Parry LLP

(57) ABSTRACT

Sugarcane bagasse consists of mainly three polymeric components, namely cellulose (40-45%), hemicellulose (xylan) (28-30%), and lignin (19-21%). A process is herein disclosed for fractionating sugarcane bagasse into cellulose, hemicellulose and lignin with high purity α-cellulose, which is a useful raw material for preparing cellulose esters like cellulose triacetate and other high value-added cellulose plastics. Co-production and recovery of hemicellulose (xylan) and lignin in high yields and high purities, along with α-cellulose, is another important feature of this process. Sugarcane bagasse consists of a material known as pith which constitutes 30-35% by weight of bagasse. Pith contains cellulose, hemicellulose, and lignin, in addition to various other ingredients and cell mass. The process described herein discloses the use of partially depithed bagasse as a preferred raw material for fractionation. Use of sugarcane bagasse containing pith leads to a product which is lower in yield as well as poorer in color.

6 Claims, No Drawings

PROCESS FOR FRACTIONATING SUGARCANE BAGASSE INTO HIGH α-CELLULOSE PULP, XYLAN AND LIGNIN

FIELD OF THE INVENTION

The present invention relates to a process for fractionating sugarcane bagasse into high α cellulose, xylan and lignin. The separated components, are useful in the production of high value-added commercial products like cellulose ester, pentose sugars and their derived materials, and lignosulfonates and other lignin derivatives.

BACKGROUND OF THE INVENTION

Depletion of forest cover and pollution of the environment are two major concerns of mankind today. Thus there is great impetus for developing technologies that prevent the cutting down of forests, as well developing "green technologies" that reduce the quantity of chemicals used in a process. For example, the use of steam for hydrolysis reactions would be preferable to the use of chemicals for achieving the same purpose.

Agricultural wastes such as sugarcane bagasse, grain and cereal straws, jute sticks, cotton stalks, etc. are fibrous cellulosic materials consisting of cellulose, hemicellulose and lignin in nearly the same proportion as most woods, and therefore if new technologies replace wood with these materials, they would help preserve many forests and the environment. Additionally, if all the components of such cellulosic fibres are separated into their pure component polymers, i.e., cellulose, hemicellulose, and lignin, then they could provide us with pure value-added organic raw materials useful in the production of a wide variety of industrial and consumer goods such as plastics, chemicals, raw material for biofuels like butanol and ethanol. This would cultimate into a biorefinery similar to a petroleum refinery etc. It is estimated that the annual availability of agricultural cellulosic fibre waste of all types of agricultural produce is around twenty billion tonnes. Considering the immense potential of this huge and largely untapped raw material, that are currently of little industrial use, there is great interest in developing new process technologies which will create value out of waste agricultural residues.

The worldwide demand for paper is so great that most fibrous plant based lignocellulosics matter have been investigated for pulping by various processes to produce paper grade cellulose pulp. This is achieved by removing the lignin and hemicellulose constitutents in ways designed to minimize loss and damage to the cellulose fibres. In general, these processes consist of cooking or digesting the lignocellulosic plant matter with pulping chemicals at elevated temperatures and times scales sufficient to cause an acceptable degree of delignification, so as to produce a cellulosic pulp of specified characteristics, especially color, strength, gloss and printability. In most processes a large fraction of the lignin and hemicellulose constitutents extracted out from the lignocellulose plant material ("black liquor") are a source of environmental pollution as the "waste liquids" in the form of "black liquor" are let out into waste streams after expensive anti-pollution treatments. This results in valuable industrially useful organic polymeric materials like lignin and hemicellulose being lost, which if separated, could have many industrial applications. Also, the cost of pollution abatements would be avoided.

Therefore, in recent years there has been seen great interest in developing clean fractionation processes for lignocellulosic plant materials not only for paper and pulp but also to obtain pure individual streams of cellulose, hemicellulose, and lignin for use as biorefinery.

To date, however, no simple and economically viable methods are known for efficiently separating purified fractions of lignin, hemicellulose and cellulose from lignocellulosic biomass, due to the complexity of the structure and ingredients present in the natural biomass materials. Inspite of this, much research is being done worldwide to find new processes to achieve these ends, as is evident from very large number of research publications and patents.

The production of high value plastics such as cellulose esters and food grade cellulose derivatives requires high quality cellulose raw material. Hitherto, cotton linters was the raw material of choice for the production of high quality cellulose based plastics and other common derivatives like cellulose ethers. However, cotton linters are expensive and their production is limited. In recent years, extensively purified wood pulp has also become available for the manufacture of plastics like cellulose esters. However, this wood pulp is becoming increasingly expensive, and the effects of de-forestation in several countries has made it imperative to seek use of alternate sources of renewable materials.

Cellulose pulp which is available at reasonable cost from pulp and paper mills generally pertains to paper-grade cellulose, which has an α-cellulose content in the region 75-84%, and significant quantities of hemicellulose and lignin can be tolerated and are indeed desirable in their application as printing paper. This relatively abundant cellulose pulp cannot be used for preparing high quality plastics like cellulose esters. The "dissolving grade" pulp available in the market place refers to wood derived cellulose pulp which is extensively purified to remove traces of lignin and hemicellulose to obtain high α-cellulose (above 94% α-cellulose content) which is then reacted with carbon disulfide to produce soluble cellulose xanthate. The latter is then spun into fibers (viscose rayon) with evolution of carbon disulfide and regeneration of cellulose. However, there is a need to develop a process which would avoid the use of wood which is scarce in many parts of the world, and replace it with annually replenishable cellulose containing agricultural wastes such as sugarcane bagasse, wheat straw, and other such materials, which is available in abundance each year.

Sugarcane bagasse is an agricultural by-product which has the general composition of 40-45% cellulose, 28-30% hemicellulose, and 19-21% lignin. The composition varies from geographical location and age of the plant. The pith content is in the range of 30-35%. For Brazilian and Egyptian bagasse, it has been shown that depithing before acid prehydrolysis produced higher yields and quality of cellulose. Cellulose from the bagasse fibre is known to have a higher degree of polymerization than the cellulose obtained from bagasse pith.

It is well known that efficient fractionation of polymeric constituents of plant biomass has been a major obstacle in economic and ecologically viable processes. A very recent paper explains a method of removing hemicellulose and lignin by hydrothermal treatment. However, no fractionation of pure components was possible by this method. Thus there is great incentive to develop this lignocellulosic material as a source for cellulose as well as associated polymers like xylan and lignin for economic gain as well as for preventing the denudation of the forests and protecting the environment.

Reference may be made to a recent paper, Andrew, D'Agostino, Davis, DuPlooy and Kerr, Pulping Conf. Vol. 2, 1053-1061. TAPPI Press: Atlanta, Ga. (USA) (1998) CA 130:169723, which explain a steam explosion method for fine paper production; however, no mention is made of separating lignin and hemicellulose.

Similarly, reference may be made to Faria et al. Cellul. Chem. Technol. 32(5-6), 441-455 (1998) CA 131:75098, which describe a steam explosion technique only for obtaining pure grades of cellulose but no mention is made of separating lignin and hemicellulose. A paper by Ibrahim and Glasser, Bioresource Technol, 70, 181-192, 1999 describes steam explosion conditions to separate both lignin and hemicellulose, and he found that at low severities of steam up to 72% of hemicellulose could be removed, and at high severities 82% of lignin could be removed. This objective and study of the work is very different from our process, wherein the objective is to remove only one component (hemicellulose) by steam explosion, and the subsequent step (alkali treatment) to remove the lignin component.

Kaar et al, Biomass and Bioenergy, 14(3), 277-287 (1998) studied steam explosion of sugarcane bagasse as a pretreatment for ethanol. Sawada et al., J. Chem. Technol. Biotechnol. 76(2), 139-146 (2001) were interested in steam explosion for maximizing the delignification of plant biomass.

Patent BR 9005762-A (Derwent Primary Accession No. 1992-269093[33]) describes a process for cellulose production from vegetable residues using steam cracking, water extraction, alkali delignification and bleaching. However, the effects of pith content were not evaluated to improve the quality of the cellulose.

Canadian Patent CA 1282777 describes a steam explosion process to dissociate and exhort lignin and optionally the xylan from the primary wall and middle lamella while retaining the structural integrity of the fiber bundle (52 layer) in order to get a material for diaper and similar absorbent material. However, there is no claim as to the applicability of these fibers for production of cellulose acetate plastics, cellulose ethers etc.

Canadian Patent CA 1217765 uses a steam explosion process as a pretreatment to make the substrate easy to treat by enzymes for conversion to sugar and alcohols, and for the solvent extraction of liqnin. This patent does not seem to isolate pure cellulose for use in value added cellulose esters and ethers.

U.S. Pat. No. 6,419,788 has the objective of using a steam explosion process to produce cellulose substantially free of liqnin, hemicellulose and extractives, and also to lower the cost of the process. The primary focus of this research appears to be an energy recuperations for economic viability, and uses only steam, water and oxygen in the process. In several other (U.S. Pat. Nos. 5,125,977; 5,424,417; 5,503,996; 5,705,369 and 6,022,419) the focus appears to use acids solutions so as to achieve hydrolysis rather than obtain highly pure cellulose.

Rauschenberg et al., Polym. Preprints (ACS), 31(1), 650-2 (1990) studied isolation of xylan oligomers from steam exploded biomass. Schultz et al J. Agric. Food Chem., 32(5), 1166-72 (1984) used steam exploded biomass for studying enzymic rate of hydrolysis. Thus, all these published studies are not directed towards obtaining pure fractions of cellulose, hemicellulose and lignin, all in high yields, which is the objective of our work as described in the process.

OBJECTIVES OF THE INVENTION

The main objective of the present invention is to provide an economial, simple and efficient process for fractionating a wide variety of renewable lignocellulosic plant material to its major polymeric components hemicellulose, lignin and cellulose, all in high yields and high purity, which can then be used as raw materials for production of chemicals, plastics, polymers, etc.

Another objective of the present invention is to provide a process for the production of high α-cellulose pulp (α-cellulose content 90-94% from plant biomass material like depithed sugarcane bagasse (pith content 5-18%) for applications in synthesis of plastics like cellulose acetate and other specialty cellulose products.

Yet another object of the present invention is to provide a clean biomass fractionation process using steam as a hydrolyzing chemical to fractionate one component (hemicellulose).

Yet another object of the present invention is to practice minimum chemical treatments to complete the biomass fractionation process, so as to achieve an environment friendly biomass fractionation process to produce high α-cellulose pulp (α-cellulose content 90-94%), hemicellulose and lignin from plant biomass material like depithed sugarcane bagasse.

Yet another object of the present invention is to use water as a "green" reactive chemical to cause selective hydrolysis of the hemicellulose components of the lignocellulosic plant material.

Yet another object of the present invention is to provide a method which results in obtaining pulp with α-cellulose content of at least 90%, and up to 94% and having xylan content of 1-5% by weight and lignin content of 0.1-0.3% by weight.

SUMMARY OF THE INVENTION

Accordingly the present invention provides a process for the fractionation and isolation of high α-cellulose pulp, hemicellulose (xylan) and lignin from depithed fibrous organic biomass and the said process comprising the steps of:
  a) contacting the biomass with steam, at a temperatures in the range 140° C.-230° C., for period of 0.5 minute to 60 minutes, hydrolyzing and solubilizing the hemicellulose component to an extent of 70-90%, followed by evaporation of the condensed water to obtain hemicellulose,
  b) separating and washing the undissolved fibrous organic biomass with water and treating it with 10-24% alkali, at a temperatures in the range 80-180° C. to solubilize the lignin component to an extent of 90-95% as well as solubilizing the residual hemicellulose to obtain a soluble fraction containing lignin, followed by precipitation of lignin with mineral acid,
  c) separating and washing the undissolved fibrous organic biomass and bleaching it with 1-10% by weight of sodium chlorite or chlorine dioxide, at a temperature of 20-90° C., for a period if 1-18 hrs, at a pH of 3.5-4.0,
  d) Separating, washing and drying the fibrous organic residue to obtain a pulp containing 90-94% α-cellulose.

In an embodiment of the present invention the biomass used is selected from the group consisted of grassy material, straw and woody material.

In yet another embodiment the grassy material used is sugarcane bagasse.

In yet another embodiment the extent of pith contained in sugarcane bagasse used is reduced upto about 5% pith content from about 35% pith content naturally available in sugarcane bagasse.

In yet another embodiment the alkali used in step (b) is sodium hydroxide.

In yet another embodiment the mineral acid used for the precipitation of lignin in step (b) is selected from hydrochloric acid, sulfuric acid and nitric acid.

In yet another embodiment the mineral acid used for the precipitation of lignin in step (b) is preferably concentrated hydrochloric acid.

In yet another embodiment the reaction time used for bleaching in step (c) is preferably in the range of 4-6 hours.

In yet another embodiment the yield of 90-94% α-cellulose content of the pulp is 30-37% by weight of the bagasse raw material used.

In yet another embodiment the yield of isolated hemicellulose is 19-26% by weight of the bagasse raw material used.

In yet another embodiment the yield of isolated lignin is in the range of 15-16% by weight of the bagasse raw material used.

An efficient process for fractionating a wide variety of renewable lignocellulosic plant material to its major polymeric components hemicellulose, lignin and cellulose, which can then be used as raw materials for production of chemicals, plastics, polymers, etc.

A process for the present invention yields the α-cellulose content of the pulp produced by the invented process is 90-94%

The yield of the α-cellulose content of 90-94% of the pulp produced by the invented process has an yield of 30-37% of the plant biomass material weight.

The hemicellulose actually isolated by the said process using the said sugarcane bagasse has an yield of 19-26% of the plant biomass material weight.

The lignin actually isolated by the said process using the said biomass material has an yield of 15-16% of the plant material weight.

The α-cellulose (90-94% α-cellulose content of the pulp, yield 30-37% based on bagasse raw material weight), hemicellulose (xylan) (yield 19-26% based on bagasse raw material weight), lignin (yield 15-16% based on bagasse raw material weight) are all produced by the invented process.

The ratio of the biomass to the water used is 1:6 to 1:20 by weight of the biomass as in Claims 1(b) and 1(c), but preferably in the ratio 1:12.

The ratio of the biomass to the sodium chlorite used is 0.01-0.3 times the weight of the biomass material to be bleached, the ratio and pH of water to be used is well known to those skilled in the art.

DETAILED DESCRIPTION OF THE INVENTION

The process of the present invention provides a process for an economical, simple and efficient process for fractionating in high yield and high purity, a wide variety of renewable lignocellulosic plant material to its major polymeric components cellulose, lignin and hemicellulose, which can then be used as raw materials for production of chemicals, plastics, polymers, etc.

A process for the fractionation and isolation of high α-cellulose pulp, hemicellulose and lignin from fibrous organic biomass comprising (a) contacting the biomass with steam at temperatures in the range 140° C.-230° C., hydrolyzing and solubilizing the hemicellulose component to an extent of 70-90% and evaporating the water to get hemicellulose, (b) separating and washing the undissolved fibrous organic biomass and treating with 10-24% alkali at temperatures in the range 80° C.-180° C. to solubilize the lignin component to an extent of 90-95%, as well as solubilizing the residual hemicellulose, and precipitating the soluble fraction with mineral acid to get lignin, (c) separating and washing the undissolved fibrous organic biomass and bleaching with 1-6% by weight of sodium chlorite or chlorine dioxide at a temperature of 30° C.-90° C. (d) separating and washing the fibrous organic residue to get a pulp containing 90-94% α-cellulose.

The process of this invention is significantly different in methodology and the consequent results achieved, as represented in other patents on the subject. For example, PCT Int. Appl. WO 2000019004 A1 describes steam explosion of fibrous material like bagasse for producing bleached paper. Steam is passed in an alkaline pH. This is very different in process condition as well material quality obtained. In the current invention, steam is passed in neutral pH and the quality of pulp is suitable for making cellulose plastics like cellulose acetate.

Canadian patent 1,267,407, Canadian patent 1,282,777 and Canadian patent 1,217,765 describe steam explosion methods for specifically separating lignin from cellulose and hemicellulose, and the quality of products and process conditions are entirely different. In the current invention, the steam explosion is used for separating the hemicellulose from the cellulose and lignin components, and the later is later isolated by alkali treatment, leading to a quality of pulp which is suitable for making cellulose plastics like cellulose acetate after the bleaching step.

In the present invention, the fibrous organic biomass plant material is depithed sugarcane bagasse, having a pith content of 5-18%, down from about 33% pith originally present in the said material.

The α-cellulose content of the pulp produced by the invented process is 90-94%.

The yield of the α-cellulose content of 90-94% of the pulp produced by the invented process has an yield of 30-37% based on the weight of the bagasse used.

The hemicellulose produced by the said process using the said biomass material has an yield of 19-26% based on the weight of the bagasse used.

The lignin produced by the said process using the said biomass material has an yield of 15-16% based on the weight of the bagasse used.

The α-cellulose (30-37% yield based on the weight of the bagasse used and of 90-94% α-cellulose content of the pulp), hemicellulose (19-26% based on the weight of the bagasse used), lignin (15-16% yield based on the weight of the bagasse used), are all produced by the invented process.

The ratio of the biomass to the steam used is 1:1 to 1:10 by weight of the steam, but preferably in the ratio 1:2

The ratio of the biomass to the sodium chlorite used is 0.01-0.3 times the weight of the biomass material like depithed bagasse to be bleached, the ratio and pH of water to be used is well known to those skilled in the art.

Accordingly, the present invention provides a process for an economical, simple and efficient process for fractionating a wide variety of renewable lignocellulosic plant material to its major polymeric components cellulose, lignin and hemicellulose, which can then be used as raw materials for production of chemicals, plastics, polymers, etc.

The following examples are given by the way of illustration and therefore should not be construed to limit the scope of the invention.

The sugarcane bagasse obtained in India has the general composition of 40-45% cellulose, 28-30% hemicellulose, and 19-21% lignin. The composition varies from geographical location and age of the plant. The pith content is in the range of 30-35%.

EXAMPLE 1

Sugarcane bagasse (200 g) containing 5% pith was saturated with water and placed in a laboratory steam explosion reactor of 10 liter volume capacity. Steam was let into this reactor from a boiler having steam pressure of 35 Kg/cm$^2$, so that the reactor pressure of steam was 11 Kg/cm$^2$ and temperature was 180° C. This steam pressure was maintained in the reactor for 15 minutes, after which the reactor contents was instantly released into the atmosphere, so that the bagasse was "exploded" into fine particles. 40 g of hemicellulose (xylan) was removed by this treatment, and obtained in solid form by evaporating the water. On treating with hot water at 140° C. for 4 hours, a further 14 g of hemicellulose could be removed (thus total hemicellulose yield is 27% (w/w)). The hemicellulose obtained was hydrolyzed to about 50% to monmeric xylose, arabinose, glucose, and a fourth unidentified sugar by High performance Ion Chromatography, while the remaining 50% was in the form of oligomers. A 15 g sample of the steam exploded, material was extracted with 20 gm w/w sodium hydroxide in 200 mL water in a 300 mL Parr reactor. The residue was washed well with distilled water. The filtrate containing the lignin was precipitated with conc. HCl, the lignin was separated by centrifugation. The lignin thus obtained was washed well with distilled water and dried to give a weight of 2.4 g (16 w/w % yield). The dried pulp residue was bleached with 3% Sodium chlorite. The pH of the aqueous sodium chlorite solution was adjusted to 3.8 by addition of acetic acid. The pulp residue was bleached at 70-75° C. for 4 hours at the mentioned pH. The bleached pulp was filtered out, washed well and was oven dried. The final cellulose pulp obtained was 35.3% w/w and was pure white in color and had α-cellulose content of 93% and 0.03% residual lignin.

EXAMPLE 2

Sugarcane bagasse (200 g) containing 5% pith was placed in a laboratory model steam explosion reactor of 10 liter volume capacity. Steam was let into this reactor from a boiler having steam pressure of 35 Kg/cm$^2$, so that the reactor pressure of steam was 9 Kg/cm$^2$ and temperature was 170° C. This steam pressure was maintained in the reactor for 30 minutes, after which the reactor contents was instantly released into the atmosphere, so that the bagasse was "exploded" into fine particles. 29.3 g of hemicellulose (xylan) was removed by this treatment, and obtained in solid form by evaporating the water. On treating with hot water at 140° C. for 4 hours, a further 14.6 g of hemicellulose could be removed. A 15 g sample of the steam exploded material was extracted with 20 gm w/w sodium, hydroxide in 200 mL water in a 300 mL Parr reactor. The residue was washed well with distilled water. The filtrate containing the lignin was precipitated with conc. HCl, the lignin was separated by centrifugation. The lignin thus obtained was washed well with distilled water and dried to give a weight of 2.4 g (16 w/w % yield). The dried pulp residue was bleached with 3% Sodium chlorite. The pH of the aqueous sodium chlorite solution was adjusted to 3.8 by addition of acetic acid. The pulp residue was bleached at 70-75° C. for 4 hours at the mentioned pH. The bleached pulp was filtered out, washed well and was oven dried. The final cellulose pulp obtained was 35% w/w and pure white in color and had α-cellulose content of 91% and had 0.18% residual lignin.

EXAMPLE 3

Sugarcane bagasse (100 g) containing 35% pith was saturated with water and placed in a laboratory steam explosion reactor of 10 liter volume capacity. Steam was let into this reactor from a boiler having steam pressure of 35 Kg/cm$^2$, so that the reactor pressure of steam was 28 Kg/cm$^2$ and temperature was 230° C. This steam pressure was maintained in the reactor for 5 minutes, after which the reactor contents was instantly released into the atmosphere, so that the bagasse was "exploded" into fine pasty material. 19 g of hemicellulose (xylan) was removed by this treatment, and obtained in solid form by evaporating the water. On treating with hot water at 140° C. for 4 hours, a further 3 g of hemicellulose could be removed. The steam exploded material was extracted with 20 gm w/w sodium hydroxide in 200 mL water in a 300 mL Parr reactor. The residue was washed well with distilled water. The filtrate containing the lignin was precipitated with conc. HCl, the lignin was separated by centrifugation. The lignin thus obtained was washed well with distilled water and dried to give a weight of 14.5 g. The dried pulp residue was bleached with 3% Sodium chlorite. The pH of the aqueous sodium chlorite solution was adjusted to 3.8 by addition of acetic acid. The pulp residue was bleached at 70-75° C. for 4 hours at the mentioned pH. The bleached pulp was filtered out, washed well and was oven dried. The final cellulose pulp obtained was 35 g and was pure white in color and had α-cellulose content of 90% and 0.03% residual lignin.

EXAMPLE 4

Sugarcane bagasse (100 g) containing 35% pith was saturated with water and placed in a laboratory steam explosion reactor of 10 liter volume capacity. Steam was let into this reactor from a boiler having steam pressure of 35 Kg/cm$^2$, so that the reactor pressure of steam was 9 Kg/cm$^2$ and temperature was 170° C. This steam pressure was maintained in the reactor for 30 minutes, after which the reactor contents was instantly released into the atmosphere, so that the bagasse was "exploded" into fine fibrous material. 9.7 g of hemicellulose (xylan) was removed by this treatment, and obtained in solid form by evaporating the water. On treating with hot water at 140° C. for 4 hours, a further 5.0 g of hemicellulose could be removed. The steam exploded material was extracted with 20 gm w/w sodium hydroxide in 200 mL water in a 300 mL Parr reactor. The residue was washed well with distilled water. The filtrate containing the lignin was precipitated with conc. HCl, the lignin was separated by centrifugation. The lignin thus obtained was washed well with distilled water and dried to give a weight of 16.9 g. Xylanase treatment of this lignin showed that the residual pentosan on this lignin was 3.3%. The dried pulp residue was bleached with 3% Sodium chlorite. The pH of the aqueous sodium chlorite solution was adjusted to 3.8 by addition of acetic acid. The pulp residue was bleached at 70-75° C. for 4 hours at the mentioned pH. The bleached pulp was filtered out, washed well and was oven dried. The final cellulose pulp obtained was 32.9 g and was greyish white in color and had α-cellulose content of 94%. The other constituents of cellulose were 5% hemicellulose and 0.12% lignin.

ADVANTAGES

This invention has several advantages over the published literature and patent literature. We have not found any reference to obtaining all three fractionated products (cellulose, hemicellulose and lignin) of bagasse and other grasses in such high yields and high purities. No one has reported the characterization of their pure fractionated cellulose in terms of residual lignin content and residual hemicellulose content, as we have done. Similarly, we have characterized the isolated lignin for residual xylan content. The lower the xylan content of lignin, the superior its properties. We have also characterized the hemicellulose to show the extent of hydrolyzed sugars and oligomers obtained by this method. This is important to design enzymatic or acid hydrolysis of hemicellulose to sugars for further value-addition. This is crucial information for designing new products and derivative synthesis from the fractionated cellulose, hemicellulose and lignin. Our process thus gives to us very specific polymers (cellulose, hemicellulose and lignin) with specific characteristics, not reported elsewhere.

I claim:

1. A process for the fractionation and isolation of high α-cellulose pulp, hemicellulose (xylan) and lignin from fibrous organic biomass wherein the organic biomass is sugarcane bagasse, said process consisting essentially of:
   a) saturating the organic biomass with water;
   b) then contacting the saturated organic biomass from step (a) with steam in a steam explosion reactor at a temperature in the range 140° C.-230° C., for period of 0.5 minute to 60 minutes, hydrolyzing and solubilizing the hemicellulose component to an extent of 70%-90%, followed by exploding the saturated biomass into fine particles of biomass by instant release of pressure, followed by evaporation of condensed water to obtain hemicellulose,
   c) separating and washing the fine particles of biomass with water and treating the fine particles of biomass with 10%-24% sodium hydroxide, at a temperatures in the range 80° C.-180° C. to solubilize lignin component to an extent of 90%-95% as well as solubilizing residual hemicellulose to obtain an undissolved fibrous organic biomass and a soluble fraction containing lignin, followed by precipitation of lignin out of the soluble fraction with mineral acid,
   d) separating and washing the undissolved fibrous organic biomass and bleaching the undissolved fibrous organic biomass with 1-10% by weight of sodium chlorite or chlorine dioxide, at a temperature of 20° C.-90° C., for a period of 1-18 hrs, at a pH of 3.5-4.0 to form a bleached fibrous organic residue,
   e) separating, washing and drying the bleached fibrous organic residue to obtain a pulp containing 90%-94% α-cellulose.

2. A process according to claim 1, wherein the mineral acid used for the precipitation of lignin in step (c) is selected from hydrochloric acid, sulfuric acid and nitric acid.

3. A process according to claim 1, wherein the reaction time used for bleaching in step (d) is in the range of 4-6 hours.

4. A process according to claim 1, wherein the yield of 90-94% α-cellulose content of the pulp is 30-37% by weight of the bagasse raw material used.

5. A process according to claim 1, wherein the yield of isolated hemicellulose is 19-26% by weight of the bagasse raw material used.

6. A process according to claim 1, wherein the yield of isolated lignin is in the range of 15-16% by weight of the bagasse raw material used.

* * * * *